Inventor:
Frederick M. Littell.
By Hume Groen Clement & Hume
Attys.

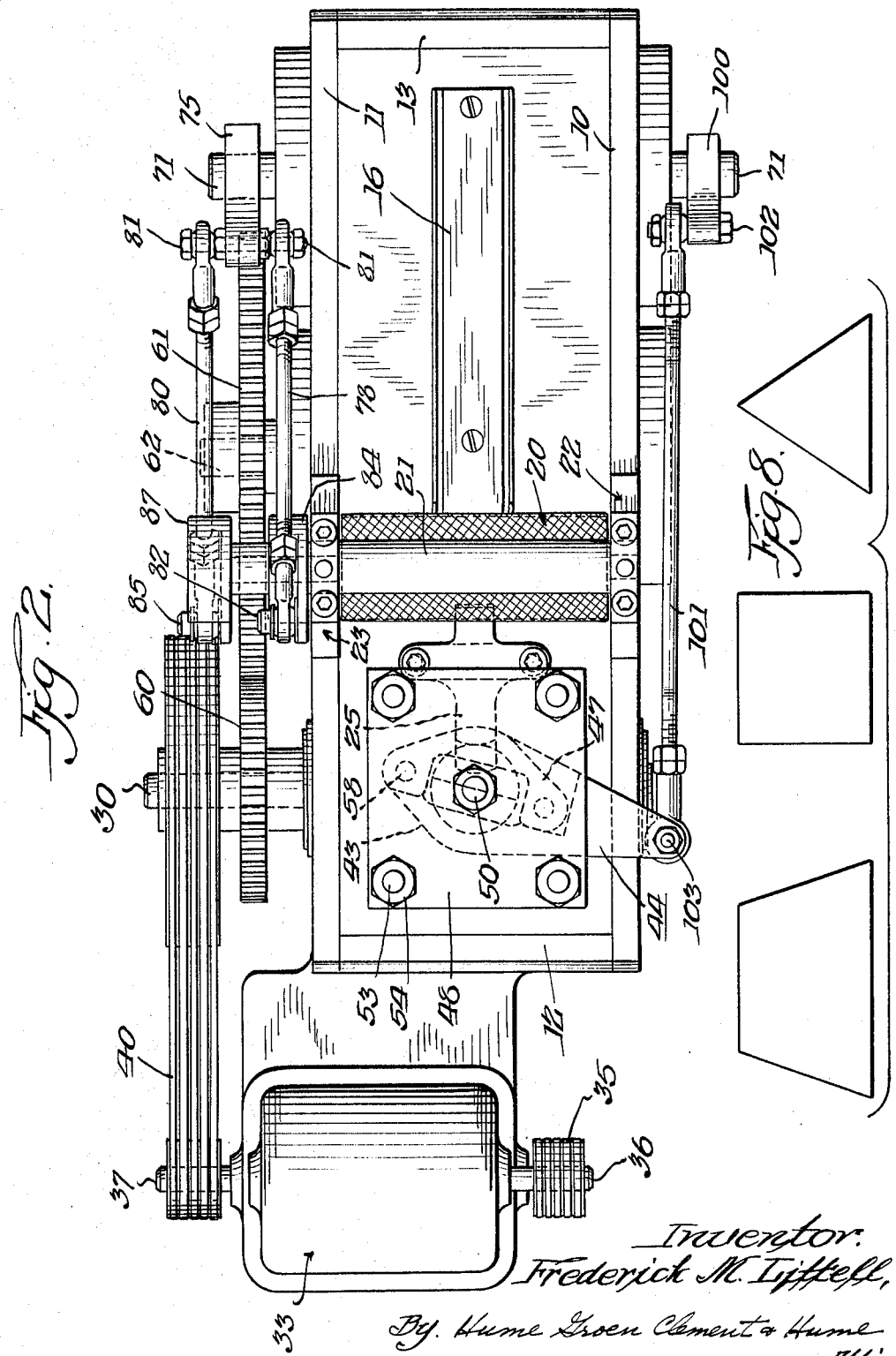

Aug. 16, 1966     F. M. LITTELL     3,266,357
COMBINATION SHEAR AND ROLL FEED
Filed Aug. 20, 1964     4 Sheets-Sheet 3
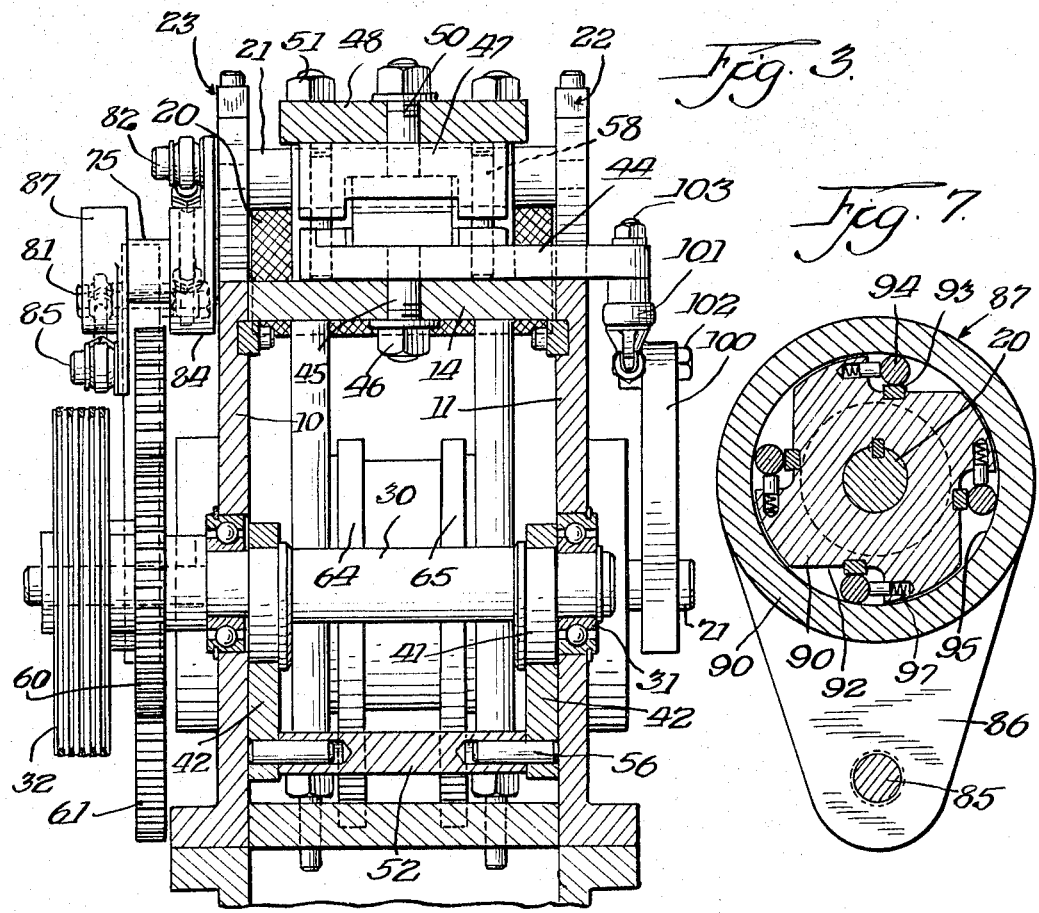
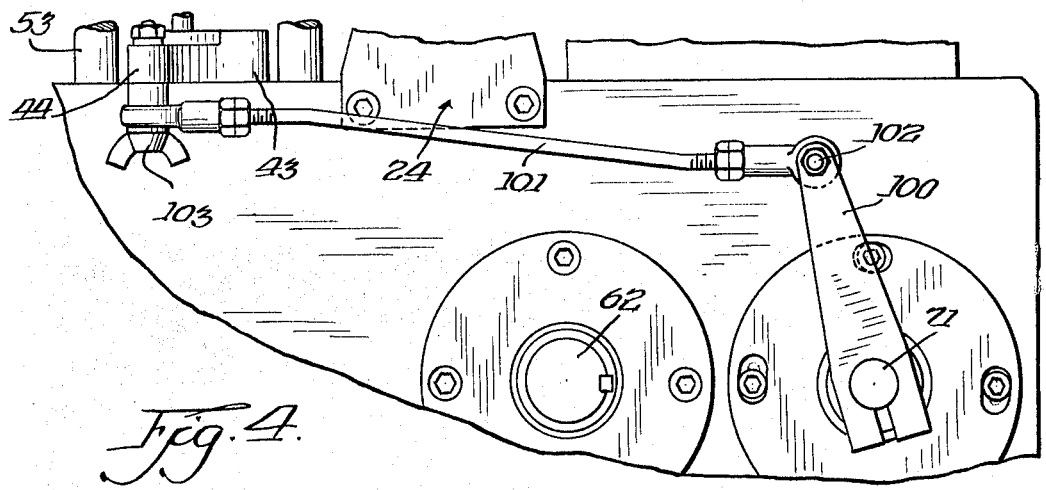
Inventor.
Frederick M. Littell.
By Hume Groen Clement & Hume
Attys.

Aug. 16, 1966   F. M. LITTELL   3,266,357
COMBINATION SHEAR AND ROLL FEED
Filed Aug. 20, 1964   4 Sheets-Sheet 4
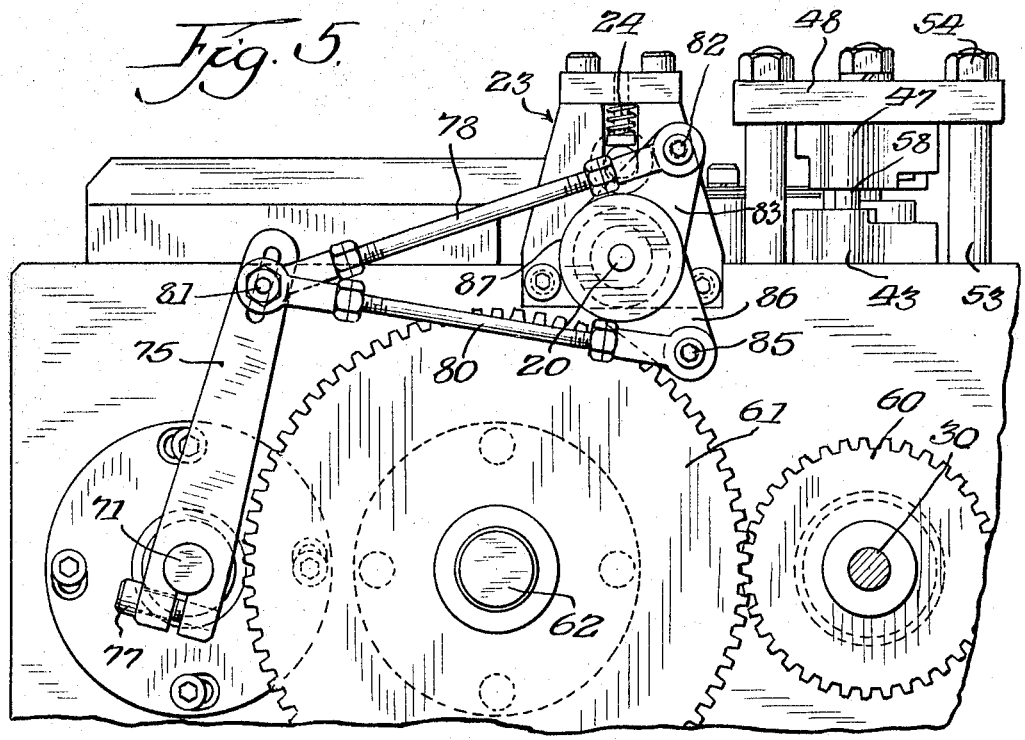
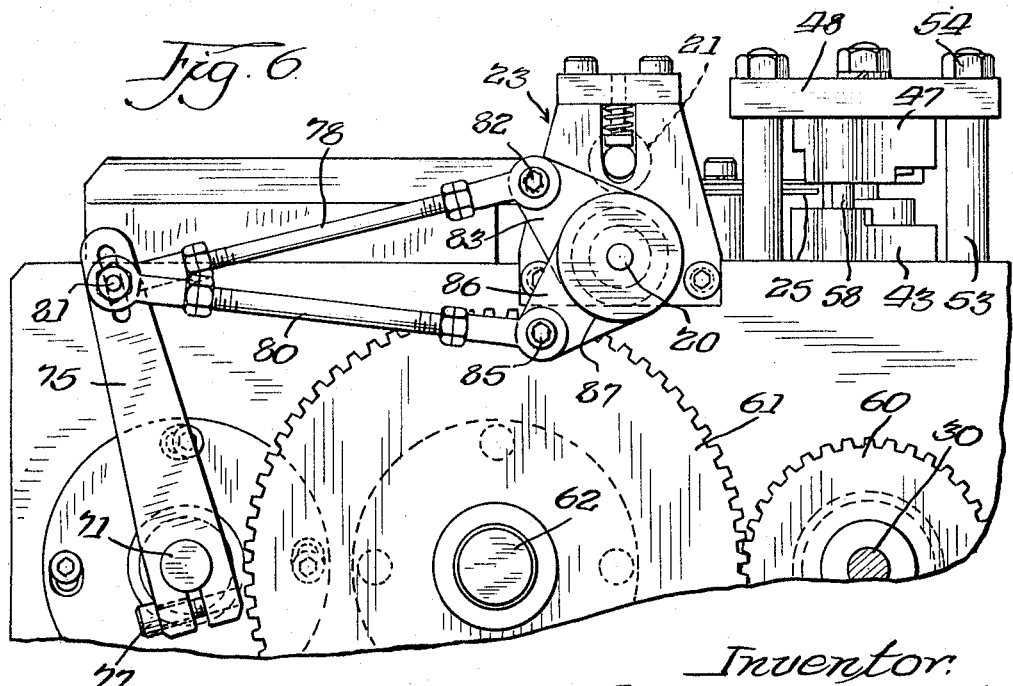
Inventor:
Frederick M. Littell.
By Hume Groen Clement & Hume
Attys.

United States Patent Office 3,266,357
Patented August 16, 1966

3,266,357
COMBINATION SHEAR AND ROLL FEED
Frederick M. Littell, Winnetka, Ill., assignor to F. J. Littell Machine Company, Chicago, Ill., a corporation of Illinois
Filed Aug. 20, 1964, Ser. No. 390,946
9 Claims. (Cl. 83—215)

The invention relates to combination feeding and shearing mechanism and has reference more particularly to improved means for intermittently feeding strip material which will have combined therewith vertically reciprocating shearing mechanism for cutting the strip material into various shapes such as trapazoids, squares and triangles.

An object of the invention resides in the provision of oscillating means for a reciprocating type shear which will be actuated as regards its cutting strokes in timed relation with the feeding means for the strip material, and also in timed relation with any oscillating movement that may be imparted to the shearing mechanism.

Another and more specific object of the invention is to provide oscillating shear mechanism wherein the upper and lower cutting knives are operatively connected for oscillation as a unit while permitting reciprocating movement of the knives relative to each other to effect a cutting stroke, and wherein the feeding mechanism is intermittent with a dwell taking place in timed relation with the cutting stroke of the knives.

Another object is to provide drive means for intermittently rotating the feed rolls of the feeding mechanism and wherein the said drive means are also employed for swinging the cutting knives to effect the said oscillating movement thereof.

Another object is to provide feeding mechanism wherein the feed rolls are rotated by means of an oscillating arm through connecting rods and a pair of clutches and wherein one clutch is operative to rotate the feed rolls as the arm oscillates in one direction, whereas the other clutch is operative to rotate the feed rolls as the arm oscillates in a reverse direction.

Another object is to provide feeding mechanism of the type and character described wherein the clutches employed are so constructed and arranged that both the acceleration forces and the deceleration forces such as are involved in each feeding cycle are positively controlled.

Another object of the invention is to provide feeding mechanism for intermittently feeding strip material which will employ a cam actuated arm operating through a pair of clutches for rotating the feed rolls and wherein a dwell period follows each operative stroke of the arm so that during the dwell period one clutch can be unlocked and the other clutch locked.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIGURE 2 is a top plan view of the combination feeding and shearing apparatus shown in FIGURE 1;

FIGURE 3 is a vertical sectional view taken transversely of the apparatus approximately on line 3—3 of FIGURE 1;

FIGURE 4 is a fragmentary side elevational view showing the actuating arm and connecting rod for swinging the shearing mechanism;

FIGURE 5 is a fragmentary side elevational view showing in one extreme position of movement the oscillating arm and clutch structure for intermittently rotating the feed rolls;

FIGURE 6 is a fragmentary side elevational view similar to FIGURE 5 but showing the oscillating arm and clutch structure in another extreme position of movement;

FIGURE 7 is a view showing in section the details of one of the clutches such as may be employed in the drive to the feed roll; and FIGURE 8 are views showing the various shapes that may be cut by the oscillating shear and feeding apparatus of the invention.

Figure 1:
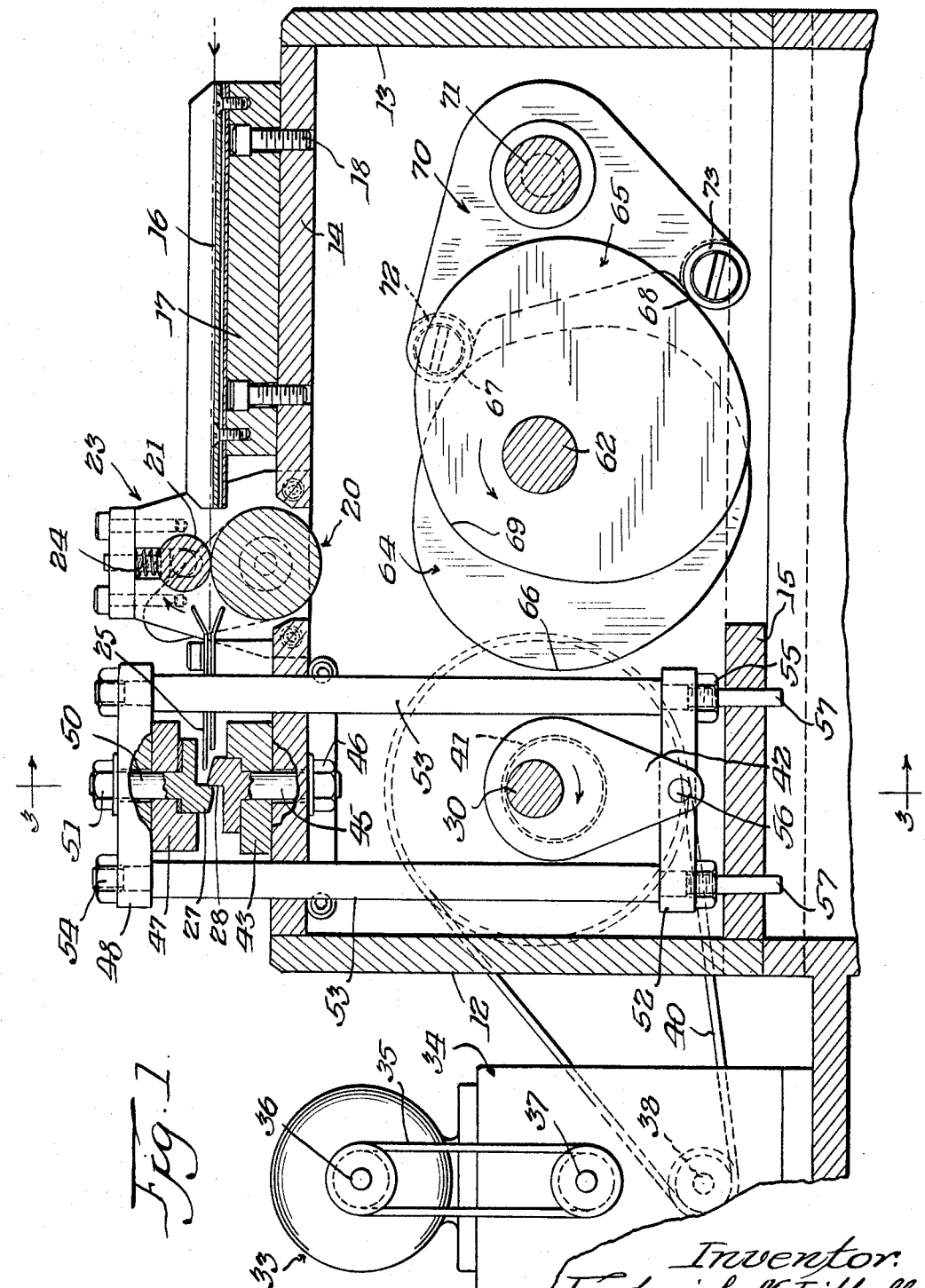
FIGURE 1 is a vertical sectional view taken longitudinally in the direction of feeding and which shows a combination feeding and shearing apparatus embodying the improvements of the invention.

The embodiment of intermittent feeding means in combination with shearing mechanism selected for illustrating the invention is shown in FIGURES 1, 2 and 3 as including a frame or housing having side walls 10 and 11, end walls 12 and 13, a top wall 14 and a bottom wall 15. The strip material indicated by the arrow in FIGURE 1 enters the right hand end of the frame structure and is supported at the entrance end by the guide channel 16 supported by member 17, which is in turn secured to the top wall 14 by the securing screws 18. The strip material is engaged and the same is fed in a direction towards the left by a pair of feeding rolls, the numeral 20 indicating the lower driving roll, and the numeral 21 indicating the upper pressure roll. The standards 22 and 23 are suitably fixed to side walls 10 and 11, respectively, and the standards project upwardly from each side wall. The said standards journal the lower driving roll 20 and also the upper pressure roll 21. The roll 20 has a knurled periphery and roll 21 is yieldingly held in contact with the lower knurled roll by the coil springs 24.

The invention provides improved means for intermittently rotating the feed rolls 20 and 21 for feeding the strip material through the guide plates 25 and into the shearing mechanism indicated in its entirety by the numeral 26. The shearing mechanism includes the upper and lower knives 27 and 28 which coact in a manner to cut the strip material into the desired lengths. Since the knives can also be oscillated on a horizontal plane, it is possible for the shearing mechanism to cut metal blanks having the trapazoidal, square or triangular shape as illustrated in FIGURE 8.

The main drive shaft 30 for the combination shear and feeding apparatus is journalled in the side walls 10 and 11 by means of the bearing structures 31 as best shown in FIGURE 3. The left end of the main shaft 30 is extended for receiving the pulley 32. The power for driving the pulley and thus the shaft 30 is provided by the electric motor 33, FIGURE 1, which is supported by the speed reducing device 34. The endless belts 35 operatively connect the drive shaft 36 of the motor 33 with the shaft 37 of the speed reducing device 34. From said device the drive at the desired speed of rotation is transmitted by the shaft 38 and by the endless belts 40 to the pulley 32 and to the main shaft 30. The eccentrics 41 are fixed to rotate with the main shaft, and said eccentrics coact with the connecting levers 42 for producing the required up and down reciprocating movement for the cutting operation.

The lower cutting knife 28 is part of the lower knife supporting member 43 which rests on and is supported by the top wall 14. The member 43 is provided with a laterally extending arm 44 and a center pivot pin 45 which depends from the member and pivotally mounts the said member for oscillating movement on a horizontal plane. The nut 46 has threaded engagement with the depending end of the pivot pin 45 for maintaining the parts in operative relation on the top wall 14 while permitting said swinging movement of the member 43 and thus the lower cutting knife 28. The upper cutting knife 27 is part of the upper knife supporting member 47 which is carried by the top plate 48 of the cross arm structure of the shear mechanism 26. Member 27 is also capable of oscillating movement in a horizontal plane and for this purpose the pivot pin 50 extends through the top plate 48 and receives the threaded nut 51. The top plate 48 and a similar bottom plate 52 are retained in spaced relation by a plurality of connecting rods 53. A connecting rod is located at each corner of the square plates and the rods extend through the top plate and through the bottom plate with their threaded projecting ends receiving the securing nuts 54 and 55, respectively. As a result, the top and bottom plates 48 and 52 and the connecting rods 53 are bolted together to form a unitary cross arm structure.

The connecting levers 42 are pivotally joined by the pins 56 to the bottom plate 52, and thus as the eccentrics 41 rotate, the connecting levers will reciprocate and an up and down reciprocating movement will be imparted to the cross arm structure which carries the upper knife 27. For guiding the said cross arm structure on its vertical reciprocating movements guide pins 57 depend from the rods 53 and the said guide pins are received in openings formed in the bottom wall 15. In a similar manner the members 43 and 47 are retained in operative relation by the guide pins 58. The said pins are fixed to the bottom member 43 and they extend upwardly, being received in openings formed in the top member 47. The pins 58 accordingly permit up and down movement of the top member 47 with respect to the bottom member 43, while retaining the parts in a manner which will permit the swinging movement of the two cutting knives on the vertical pivot axis as formed by the pivot pins 45 and 50.

The power for rotating the feeding rolls 20 and 21 is taken from the main shaft 30 by means of the meshing gear wheels 60 and 61 which have pitch diameters in the ratio of one to two so that two revolutions of shaft 30 are required for one revolution of the large gear 61, and thus for one revolution of the cam shaft 62 to which the large gear is secured. The said shaft 62 is suitably journalled in the side frames 10 and 11 and the shaft projects beyond the wall 11 to form an extending end to which the gear 61 is secured. Within the housing the shaft carries the conjugate cams 64 and 65, FIGURE 1, the cams being fixed so as to rotate with the shaft and being suitably spaced along the length of the shaft. Each cam has a high and a low portion. For cam 64 the high portion is indicated by numeral 66 and the low portion by numeral 67. For cam 65 the high and low portions are indicated by numerals 68 and 69. The rotating conjugate cams actuate a cam lever 70 which is fixed on the transverse shaft 71. The said shaft is journalled by the side walls 10 and 11 and the same extends beyond the side walls at respective ends for purposes which will be presently described. The cam lever 70 carries a pair of rollers 72 and 73 which are displaced in different vertical planes so that roller 72 has contact with cam 64 and roller 73 has contact with cam 65. Accordingly as the cams rotate the cam lever 70 and thus shaft 71 is given oscillating movement and which in accordance with the invention produces swinging movement of the cutting knives and also feeding rotation of the feed rolls.

The clutch actuating lever 75 FIGURES 5 and 6 is adjustably fixed to the left hand extending end of the shaft 71. At its upper end the lever is slotted at 76 and the base portion of the lever is bifurcated so that the lever can be fixedly secured in adjusted position on shaft 71 by tightening the bolt 77. Two connecting rods namely 78 and 80 are pivotally secured at 81 to the clutch actuating lever 75, the connection at 81 being located in the slot 76 and thus the connection can be adjusted along the length of the slot to vary the extent of the feeding action of the feed rolls. The connecting rod 78 is pivotally joined at 82 to the arm 83 of a clutch 84. The said clutch is operatively mounted on the left hand extending end of the feed roll shaft 20 as seen in FIGURES 2 and 3.

The action of the clutch actuating lever 75 and the clutch 84 is such that the clutch is operative to rotate the feed roll 20 when the lever 75 has an oscillating stroke in a clockwise direction. This may be considered as a pushing stroke for the clutch 84, since the arm 83 is rotated clockwise and the clutch 84 is operative to impart the movement to the feed roll 20. Following a dwell period, the lever 75 will oscillate in a reverse direction, that is, counterclockwise and through connecting rod 80, which is pivoted at 85 to arm 86 of the clutch 87, the said clutch is operative to transmit the clockwise movement of the arm 86 to the feed roll 20. This action of clutch 87 may be considered a pulling stroke and it will be understood that a similar dwell period occurs before lever 75 moves again in a clockwise direction.

Details of clutch structure such as may be operative for purposes of the present invention are shown in FIGURE 7 wherein the clutch 87 having the depending arm 86 includes the annular casing or housing 90. Within the housing the hub member 91 is keyed to the shaft 20 and said hub member is provided with four off-center gripping faces 92, each having a hardened steel insert 93. The rollers 94 are located between the gripping faces and the inside cylindrical gripping surface 95 of the casing 90, and by means of the pins 96 backed by the coil springs 97, a one way clutch is provided which transmits rotation to the feed roll 20 only when the casing 90 is rotated in a clockwise direction.

Two friction clutches or two electric clutches may be employed in the place of clutches 84 and 87. By using tight clutches both the acceleration forces and the deceleration forces which are involved in each feeding cycle can be positively controlled. When using clutches such as 84 and 87, it is desirable to use in combination therewith either a friction clutch or a friction brake in order to control overrunning of the feed rools beyond the exact displacement called for by the particular adjustment. It has been previously mentioned that the feed rolls have a dwell period at the end of each feeding stroke. This dwell period may be employed for locking up one clutch and for unlocking the other clutch in the event electric clutches are employed or in the event hyrdaulically actuated clutch structure is employed.

The action of the clutch devices 84 and 87 is such as to translate both oscillating strokes of the lever 75 into feeding rotation of the feed roll 20. This is due to the fact that one actuating arm namely 83 for the clutch 84 extends upwardly from shaft 20 and the other arm namely 86 for clutch 87 extends downwardly. The feeding action of the feed rolls is always in the same direction and the timing is such that the strip material is fed forwardly when the cutting knives are in separated relation.

The conjugate cam structure is so arranged that two revolutions of shaft 30 are required for one revolution of shaft 62. Also, the cams and cam lever arrangement are so constructed and arranged as to cause the cam lever 70 and thus shaft 71 to oscillate and then dwell. In other words, the lever 75 will oscillate in a direction towards the right, FIGURE 5, and then dwell for a fraction of a revolution of shaft 62. Likewise upon oscillating in a direction to the left, FIGURE 6, the lever 75 will dwell for a similar period of time. The oscillating portion and the dwell portion of each stroke of lever 75 may vary, although it has been found commercially practicable to produce oscillating movement of shaft 71 for 135 degrees and then have a dwell period of 45 degrees for each one-half revolution of the conjugate cam structure. This will require one revolution of the main shaft 30 and as regards said main shaft the timing is thus doubled so that the feed rolls will be rotated for 270 degrees of each revolution of the main operating shaft and the dwell period which follows will have a duration of 90 degrees.

The swinging of the cutting knives 27 and 28 also takes place in timed relation with the feeding action of the feed rolls. Actually the cutting knives are oscillated during the feeding action of the rolls and at which time the cutting knives are in separated relation. During the dwell period the knife supporting members 43 and 47 are held stationary in their oscillated position, and knife 27 will be actuated downwardly to effect a cutting stroke. The swinging or oscillating movement of the knife supporting members 43 and 47 is effected by the lever 100, FIGURE 4, which is fixed to the right hand extending end of shaft 71. The connecting rod 101 is pivoted at 102 to the lever 100 and said connecting rod at its opposite end is pivotally connected at 103 to the arm 44 of the knife supporting member 43. As the shaft 71 oscillates to impart rotation to the feed rolls the knife supporting structure is also oscillated by the said shaft. The swinging movements of the knife supporting structure will effect angular cutting of the strip material to provide the various shapes as shown in FIGURE 8. The extent of swinging movement may be varied by changing the length of the lever 100 or the lever may be slotted for receiving the pivot connection 102 so that the same can be adjusted along the length of the slot. For some operations it may be desirable to eliminate the swinging movement of the knives, in which case the connecting rod 101 can be disconnected from arm 44 at the pivot connection 103.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. Apparatus for feeding strip material to cutting mechanism, the combination including a frame structure journalling a feed roll drive shaft, a second rotatable shaft journalled by the frame structure, a pair of conjugate cams on said second rotatable shaft, a third shaft journalled by said frame structure, a cam lever on said third shaft and which has operative contact with said conjugate cams, said cams upon rotation thereof effecting oscillating movement of the cam lever and thus said third shaft with a dwell period between each oscillating stroke, a second lever fixed to third shaft, a pair of clutch devices on the feed roll drive shaft, and means operatively connecting the clutch devices with the second lever.

2. Apparatus for feeding strip material to cutting mechanism, the combination including a frame structure journalling a feed roll drive shaft, a second rotatable shaft journalled by the frame structure, a pair of conjugate cams on said second rotatable shaft, a third shaft journalled by said frame structure, a cam lever on said third shaft and which has operative contact with said conjugate cams, said cams each having a high and a low portion and said cams being so arranged as to effect oscillating movement of the cam lever and thus said third shaft with a dwell period between each oscillating stroke, a second lever fixed to said third shaft, a pair of clutch devices on the feed roll drive shaft, and separate means connecting each clutch device with the second lever, one clutch device being operative for rotating said shaft in a feeding direction upon oscillation of the second lever in a clockwise direction, the other clutch device being operative for rotating said shaft in a feeding direction upon oscillation of the second lever in a counter-clockwise direction.

3. Apparatus for feeding strip material to cutting mechanism as defined by claim 2, additionally including an actuating arm for each clutch device, and wherein the actuating arm of one clutch device extends radially to one side of the feed roll shaft and the arm of the other clutch device extends radially to the opposite side of the feed roll shaft.

4. Apparatus for feeding strip material to cutting mechanism as defined by claim 2, wherein the conjugate cams are so arranged as to effect a feeding action of the feed roll drive shaft for approximately 135 degrees of rotation of the second shaft followed by a dwell period for approximately 45 degrees of rotation of the second shaft.

5. Apparatus for cutting strip material, the combination including a lower knife and an upper knife, means mounting the upper knife for reciprocating movement towards and from the lower knife for coaction therewith to perform a cutting operation, means producing said reciprocating movement of the upper knife including a main operating shaft, means for feeding the strip material to between the cutting knives when the knives are separated, said feeding means including a feed roll drive shaft, a rotatable shaft carrying a pair of conjugate cams, an oscillating lever, said cams each having a high portion and a low portion and said cams being so arranged as to produce oscillating movement of the lever with a dwell period taking place at the end of each oscillating stroke, means connecting the oscillating lever with the feed roll drive shaft including a pair of clutch devices operatively mounted on the feed roll drive shaft, one clutch device being operative to rotate the feed roll shaft in a feeding direction as the lever oscillates in a clockwise direction and the other clutch device being operative to rotate the feed roll shaft in a feeding direction as the lever oscillates in a counter-clockwise direction, and gear means connecting the main operating shaft with the rotatable shaft, whereby the feeding of the strip material takes place intermittently and in timed relation with the reciprocating movement of the upper cutting knife.

6. Apparatus for cutting strip material as defined by claim 5, additionally including means mounting the cutting knives for oscillating movement as a unitary structure while permitting the said reciprocating movement of the upper knife, and connecting means operatively joining the unitary structure with the oscillating lever, whereby the said unitary structure is oscillated in timed relation to the feeding action of the feed roll drive shaft.

7. In apparatus for cutting strip material, the combination including a lower knife and an upper knife, means mounting the upper knife for reciprocating movement towards and from the lower knife for coaction therewith to perform a cutting operation, means producing said reciprocating movements of the upper knife including a main operating shaft, means for feeding the strip material to between the cutting knives when the knives are separated, said feeding means including a feed roll drive shaft, an oscillating lever, a pair of rotating conjugate cams having operative connection with the lever, said conjugate cams being constructed and arranged to produce oscillating movements of the lever with a dwell period taking place at the end of each oscillating stroke, and means connecting the oscillating lever with the feed roll drive shaft, said connecting means including clutch devices on the feed roll drive shaft operative to effect a feeding rotation of the feed roll drive shaft for each oscillating stroke as the lever oscillates between said dwell periods, whereby the feeding of the strip material takes place intermittently.

8. Apparatus for cutting strip material as defined by claim 7, additionally including means on the main operating shaft for rotating the conjugate cams to produce actuation of the oscillating lever in timed relation with the reciprocating movements of the upper cutting knife.

9. Apparatus for cutting strip material, in combination, a lower cutting knife, an upper cutting knife, means mounting the upper cutting knife for reciprocating movements toward and from the lower knife for coaction therewith to perform a cutting operation, means producing said reciprocating movements of the upper knife including a main operating shaft, means for feeding the strip material to between the cutting knives when the knives are separated, said feeding means including a feed roll drive shaft, an oscillating lever, means operative to produce oscillating movements of the lever with a dwell period taking place at the end of each oscillating stroke, said means including conjugate cams carried by a rotatable shaft, additional means connecting the oscillating lever with the feed roll drive shaft, said additional means including a pair of one-way driving clutches on the feed roll drive shaft, one of said driving clutches being operative when actuated by the lever oscillating in one direction and the other driving clutch being operative when actuated by the lever oscillating in the reverse direction, whereby a feeding rotation of the feed roll drive shaft is effected for each oscillating stroke as the lever oscillates between the dwell periods, and gear means connecting the main operating shaft with said rotatable shaft for rotating the conjugate cams in timed relation with the reciprocating movements of the upper cutting knife.

References Cited by the Examiner
UNITED STATES PATENTS 2,045,046   6/1936   Mudd _____ 226—156 X
3,122,042   2/1964   Littell et al. _____ 83—215

ANDREW R. JUHASZ, *Primary Examiner.*